United States Patent
Marchini et al.

(10) Patent No.: US 10,214,640 B2
(45) Date of Patent: Feb. 26, 2019

(54) SOFT AND FLEXIBLE POLYOLEFIN COMPOSITION

(71) Applicant: BASELL POLIOLEFINE ITALIA S.R.L., Milan (IT)

(72) Inventors: Roberta Marchini, Ferrara (IT); Stefano Spataro, Ferrara (IT); Stefano Pasquali, Ferrara (IT); Gianluca Musacchi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 58 days.

(21) Appl. No.: 15/536,052

(22) PCT Filed: Nov. 17, 2015

(86) PCT No.: PCT/EP2015/076770
§ 371 (c)(1),
(2) Date: Jun. 14, 2017

(87) PCT Pub. No.: WO2016/096281
PCT Pub. Date: Jun. 23, 2016

(65) Prior Publication Data
US 2017/0335094 A1  Nov. 23, 2017

(30) Foreign Application Priority Data
Dec. 19, 2014 (EP) .................... 14199203

(51) Int. Cl.
*C08L 23/20* (2006.01)
*B65D 41/04* (2006.01)

(52) U.S. Cl.
CPC ......... *C08L 23/20* (2013.01); *B65D 41/0435* (2013.01); *C08L 2205/02* (2013.01)

(58) Field of Classification Search
CPC ......... C08L 23/20; C08L 23/14; C08L 23/12; C08L 2205/02; B65D 41/0435
See application file for complete search history.

(56) References Cited

U.S. PATENT DOCUMENTS

| 6,913,834 B2 * | 7/2005 | Kanamaru et al. ..... B32B 27/32 428/515 |
| 2004/0211744 A1 | 10/2004 | Marzokah |
| 2015/0225623 A1 * | 8/2015 | Akai et al. ............. C08L 23/22 525/240 |

FOREIGN PATENT DOCUMENTS

| EP | 2551109 A1 | 1/2013 |
| EP | 2631271 A1 | 8/2013 |
| WO | WO-2010069775 A1 | 6/2010 |
| WO | WO-2012152803 A1 | 11/2012 |

OTHER PUBLICATIONS

International Search Report and Written Opinion dated Jan. 25, 2016 (Jan. 25, 2016) for Corresponding PCT/EP2015/076770.

* cited by examiner

*Primary Examiner* — Nathan M Nutter

(57) ABSTRACT

The present disclosure provides a polyolefin composition made from or containing:
A) from about 63 to about 78% by weight of a copolymer of butene-1 with ethylene having a copolymerized ethylene content of up to about 18% by mole and no melting peak detectable at the DSC at the second heating scan;
B) from about 22 to about 37% by weight of (i) a propylene homopolymer, or (ii) a propylene copolymer, or (iii) a mixture of two or more of (i) and (ii), having a melting temperature $T_m$, measured by DSC at the second heating scan, of from about 130° C. to about 165° C.;
wherein (i) the amounts of A) and B) are referred to the total weight of A)+B) and (ii) having a melting enthalpy $\Delta H_{fus}$, measured by DSC at the second heating scan, of from 7 to 30 J/g.

13 Claims, No Drawings

SOFT AND FLEXIBLE POLYOLEFIN COMPOSITION

This application is the U.S. National Phase of PCT International Application PCT/EP2015/076770, filed Nov. 17, 2015, claiming benefit of priority to European Patent Application No. 14199203.2, filed Dec. 19, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a flexible and thermoplastic polyolefin composition having low values of shore hardness in combination with good tensile and elastic properties.

BACKGROUND OF THE INVENTION

Polyolefin compositions having high flexibility and a good thermoplastic behavior are useful in many application fields. The utility of some polyolefins results from the chemical inertia, mechanical properties and nontoxicity of those polyolefins.

Some polyolefins have crystalline and amorphous portions in various relative amounts.

In some polyolefins, the crystalline and amorphous portions are present in the same polymer chain or distinct phases.

The chemical composition of such portions, their relative amounts, and how the portions are combined in the polyolefin composition can determine the properties of the polyolefin.

For some compositions, it is challenging to balance flexibility, softness and thermoplastic behavior.

It is useful to provide a polyolefin composition for preparing liners for closures, providing a tight and durable seal.

SUMMARY OF THE INVENTION

In a general embodiment, the present disclosure provides a polyolefin composition made from or containing:
  A) from about 63 to about 78% by weight, based upon the total weight of the polyolefin composition, alternatively from about 64 to about 76% by weight, of a copolymer of butene-1 with ethylene having a copolymerized ethylene content of up to about 18% by mole, based upon the molar composition of the copolymer, and no melting peak detectable at the DSC at the second heating scan and
  B) from about 22 to about 37% by weight, based upon the total weight of the polyolefin composition, alternatively from about 24 to about 36% by weight, of (i) a propylene homopolymer, or (ii) a propylene copolymer, or (iii) a mixture of two or more of (i) and (ii), having a melting temperature $T_m$, measured by DSC at the second heating scan, of from about 130° C. to about 165° C., alternatively from about 131 to about 165° C., alternatively from about 131 to about 160° C.,
wherein (i) the total weight of A)+B)=100 and the DSC second heating scan is carried out with a heating rate of 10° C. per minute and (ii) having a melting enthalpy $\Delta H_{fus}$, measured by DSC (Differential Scanning calorimetry) at the second heating scan, of from about 7 to about 30 J/g, alternatively from about 8 to about 28 J/g.

In some embodiments, the composition provided has high softness (Shore A lower than about 90), good tensile properties (elongation at break of 900-1000%) and elastic properties (compression set at 22° C. lower than about 50) while maintaining a thermoplastic behavior from the presence of a crystalline fraction, as evidenced by the melting enthalpy values.

DETAILED DESCRIPTION OF THE INVENTION

In some embodiments, the polyolefin composition provided herein has low values of flexural modulus, alternatively equal to or lower than about 150 MPa, alternatively equal to or lower than about 100 MPa, alternatively from about 150 to about 20 MPa, and alternatively from about 100 to about 20 MPa.

In some embodiments, relative amounts of polymer components A) and B) are of about 69% by weight or lower of A) and of about 31% by weight or higher of B), alternatively from about 63 to about 69% by weight of A) and from about 31 to about 37% of B), alternatively from about 64 to about 69% by weight of A) and from about 31 to about 36% by weight of B), referred to the total weight of A)+B)=100, alternatively from about 63 to about 68% by weight of A) and from about 32 to about 37% of B), alternatively from about 64 to about 68% by weight of A) and from about 32 to about 36% by weight of B), referred to the total weight of A)+B)=100.

In some embodiments, component B) is a propylene copolymer (i) or a mixture (iii) of a propylene homopolymer and a propylene copolymer.

In some embodiments, the polyolefin compositions are made from or contain about 70 to about 78% by weight, alternatively from about 70 to about 76% by weight of A) and from about 22 to about 30%, alternatively from about 24 to about 30% of B), referred to the total weight of A)+B)=100.

In some embodiments, the polyolefin composition provided herein has a melting temperature $T_m$ which is equal or close to the melting temperature $T_m$ of the propylene homopolymer or copolymer component B). In some embodiments, the melting temperature is in the range from about 130° C. to about 165° C., alternatively from about 132 to about 165° C., alternatively from about 132 to about 160° C.

In some embodiments, a single melting peak is detected in the second DSC scan of the propylene homopolymer or copolymer component B) and in the second DSC scan of the polyolefin composition in the temperature range.

If multiple melting peaks are detected, the temperature of the most intense melting peak in the temperature range is to be taken as the $T_m$ value for both component B) and the polyolefin composition made from or containing A) and B).

In some embodiments, the $\Delta H_{fus}$ value for the polyolefin composition is determined from the area of the melting peak or the total area of the melting peaks (if more than one) in the DSC temperature range from about 130° to about 160° C.

In some embodiments, the MIE of the composition is from about 0.5 to about 8 g/10 min., where MIE is the melt flow index at 190° C. with a load of 2.16 kg, determined according to ISO 1133.

In some embodiments, the Shore A values for the compositions are of lower than about 90, alternatively equal to or lower than about 88, alternatively the lower limit being about 70.

In some embodiments, the Shore D values are equal to or lower than about 20, alternatively from about 20 to about 5, alternatively lower than about 20, or alternatively from lower than about 20 to about 5.

The butene-1 copolymer component A) immediately after it has been melted and cooled does not show a melting peak at the second heating scan. In other words, the butene-1 copolymer shows no melting temperature attributable to polybutene-1 crystallinity (TmII)$_{DSC}$, measured after cancelling the thermal history of the sample according to the DSC method described herein. However, the butene-1 copolymer is crystallizable. That is, after about 10 days, the polymer shows a measurable melting point and a melting enthalpy measured by DSC.

In some embodiments, the butene-1 copolymer component A) has at least one of the following additional features:

MIE of from about 0.5 to about 3 g/10 min.;

a lower limit of the copolymerized ethylene content of about 12% by mole, based upon the molar composition of the copolymer;

a Shore A value equal to or lower than about 80, alternatively equal to or lower than about 70, alternatively from about 80 to about 40, or alternatively from about 70 to about 40;

a Shore D value equal to or lower than about 20, alternatively from about 20 to about 5, alternatively lower than about 20, alternatively from lower than about 20 to about 5;

a $M_w/M_n$ value, where $M_w$ is the weight average molar mass and $M_n$ is the number average molar mass, both measured by GPC, equal to or lower than about 3, alternatively from about 3 to about 1.5.

a tension set of less than about 30% at 100% of deformation at 23° C. (ISO 2285), alternatively equal to or less than about 20%, wherein the lower limit is about 5;

a percentage of butene-1 units in form of isotactic pentads (mmmm %) greater than about 80%, alternatively equal to or greater than about 85%, alternatively equal to or greater than about 90%, wherein the upper limit is about 99%;

tensile stress at break, measured according to ISO 527, of from about 3 MPa to about 20 MPa, alternatively from about 4 MPa to about 13 MPa;

tensile elongation at break, measured according to ISO 527, of from about 550% to about 1000%; alternatively from about 700% to about 1000%;

intrinsic viscosity (I.V.) equal to or higher than about 1 dl/g; alternatively equal to or higher than about 1.5 dl/g, wherein the upper limit is about 3 dl/g;

crystallinity of less than about 30% measured via X-ray, alternatively less than about 20%;

density of about 0.895 g/cm$^3$ or less, alternatively about 0.875 g/cm$^3$ or less; wherein the lower limit is about 0.86 g/cm$^3$;

content of xylene insoluble fraction at 0° C. of less than about 15% by weight, wherein the lower limit is about 0%.

In some embodiments, the butene-1 copolymer component A) is obtained by polymerizing the monomer(s) in the presence of a metallocene catalyst system obtainable by contacting:

a stereorigid metallocene compound;

an alumoxane or a compound capable of forming an alkyl metallocene cation; and, optionally, an organo aluminum compound.

In some embodiments, the stereorigid metallocene compound belongs to the following formula (I):

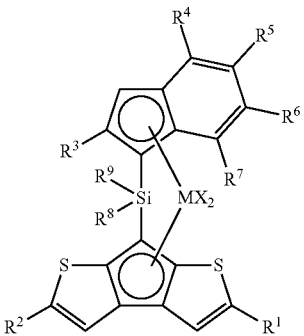

wherein:

M is an atom of a transition metal selected from those belonging to group 4; alternatively M is zirconium;

X, equal to or different from each other, is a hydrogen atom, a halogen atom, a R, OR, OR'O, OSO$_2$CF$_3$, OCOR, SR, NR$_2$ or PR$_2$ group wherein R is a linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radical, optionally containing heteroatoms belonging to groups 13-17 of the Periodic Table of the Elements; and R' is a C$_1$-C$_{20}$-alkylidene, C$_6$-C$_{20}$-arylidene, C$_7$-C$_{20}$-alkylarylidene, or C$_7$-C$_{20}$-arylalkylidene radical;

R$^1$, R$^2$, R$^5$, R$^6$, R$^7$, R$^8$ and R$^9$, equal to or different from each other, are hydrogen atoms, or linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing heteroatoms belonging to groups 13-17 of the Periodic Table of the Elements; or R$^5$ and R$^6$, and/or R$^8$ and R$^9$ can optionally form a saturated or unsaturated, 5 or 6 membered rings, the ring can bear C$_1$-C$_{20}$ alkyl radicals as substituents; providing that at least one of R$^6$ or R$^7$ is a linear or branched, saturated or unsaturated C$_1$-C$_{20}$-alkyl radical, optionally containing heteroatoms belonging to groups 13-17 of the Periodic Table of the Elements;

R$^3$ and R$^4$, equal to or different from each other, are linear or branched, saturated or unsaturated C$_1$-C$_{20}$-alkyl radicals, optionally containing heteroatoms belonging to groups 13-17 of the Periodic Table of the Elements. In some embodiments, X is a hydrogen atom, a halogen atom, a OR'O or R group. In some embodiments, X is chlorine or a methyl radical. In some embodiments, one or more of R$^1$, R$^2$, R$^5$, R$^6$, R$^7$, R$^8$ and R$^9$ is a C$_1$-C$_{10}$-alkyl radical. In some embodiments, R$^3$ and R$^4$ is equal to or different from each other are C$_1$-C$_{10}$-alkyl radicals; alternatively R$^3$ is a methyl, or ethyl radical; and R$^4$ is a methyl, ethyl or isopropyl radical.

In some embodiments, the compounds of formula (I) have formula (Ia):

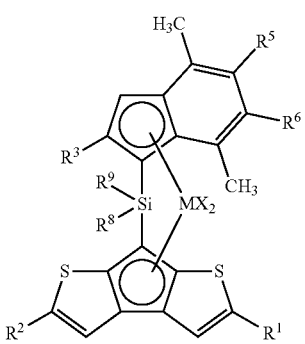

(Ia)

Wherein:

M, X, $R^1$, $R^2$, $R^5$, $R^6$, $R^8$ and $R^9$ have been described above;
$R^3$ is a linear or branched, saturated or unsaturated $C_1$-$C_{20}$-alkyl radical, optionally containing heteroatoms belonging to groups 13-17 of the Periodic Table of the Elements; alternatively $R^3$ is a $C_1$-$C_{10}$-alkyl radical; alternatively $R^3$ is a methyl, or ethyl radical.

In some embodiments, the metallocene compounds can be dimethylsilanediyl{(1-(2,4,7-trimethylindenyl)-7-(2,5-dimethyl-cyclopenta[1,2-b:4,3-b']-dithiophene)}Zirconium dichloride and dimethylsilanediyl{(1-(2,4,7-trimethylindenyl)-7-(2,5-dimethyl-cyclopenta[1,2-b:4,3-b']-dithiophene)}Zirconium dimethyl.

In some embodiments, the alumoxanes are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

In some embodiments, the alkylmetallocene cation is prepared from compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. In some embodiments, the anion E is made from or containing one or more boron atoms.

In some embodiments, the organo aluminum compound is selected from the group consisting of trimethylaluminum (TMA), triisobutylaluminium (TIBAL), tris(2,4,4-trimethyl-pentyl)aluminum (TIOA), tris(2,3-dimethylbutyl)aluminium (TDMBA) and tris(2,3,3-trimethylbutyl)aluminum (TTMBA).

In some embodiments, the catalyst system and the polymerization processes employing such catalyst system are disclosed in Patent Cooperation Treaty Publication Nos. WO2004099269 and WO2009000637, incorporated herein by reference.

In some embodiments, the polymerization process for the preparation of the butene-1 copolymer component A) is carried out via slurry polymerization using as diluent a liquid inert hydrocarbon, or solution polymerization. In some embodiments, the polymerization process occurs in the gas-phase, operating in one or more fluidized bed or mechanically agitated reactors. In some embodiments, liquid butene-1 is a reaction medium.

In some embodiments, the polymerization temperature is from about −100° C. to about 200° C., alternatively from about 20° C. to about 120° C., alternatively from about 40° C. to about 90° C., or alternatively from about 50° C. to about 80° C.

In some embodiments, the polymerization pressure is between about 0.5 and about 100 bar.

The polymerization can be carried out in one or more reactors that can work under same or different reaction conditions such as concentration of molecular weight regulator, comonomer concentration, temperature, pressure etc.

The propylene homopolymer or copolymer component B) is a semicrystalline polymer, as evidenced the melting point values, and has a stereoregularity of isotactic type.

In some embodiments, the propylene polymer has a solubility in xylene at room temperature (about 25° C.) equal to or lower than about 25% by weight, based upon the total weight of the polymer; the lower limit being about 0.5% by weight.

In some embodiments, the propylene polymer has MFRL values from about 0.5 to about 9 g/10 min, alternatively from about 1 to about 8 g/10 min., where MFRL is the melt flow index at 230° C. with a load of 2.16 kg, determined according to ISO 1133.

In some embodiments, the copolymers B) are the copolymers of propylene with one or more comonomers selected from ethylene, $C_4$-$C_{10}$ alpha-olefins and their combinations.

As used herein, the term "copolymer" includes polymers containing more than one kind of comonomers.

In some embodiments, the amounts of comonomers in B) are from about 1 to about 15% by weight, based upon the total weight of the copolymer, alternatively from about 2 to about 10% by weight.

In some embodiments, the $C_4$-$C_{10}$ alpha-olefins are selected from olefins having formula $CH_2$=CHR wherein R is an alkyl radical, linear or branched, or an aryl radical, having from 2 to 8 carbon atoms.

In some embodiments, the $C_4$-$C_{10}$ alpha-olefins are selected from the group consisting of butene-1, pentene-1, 4-methylpentene-1, hexene-1 and octene-1.

In some embodiments, the comonomers in the propylene copolymer B) are selected from the group consisting of ethylene, butene-1 and hexene-1.

In some embodiments, the propylene homopolymer or copolymer component B) is prepared by using a Ziegler-Natta catalyst or a metallocene-based catalyst system.

In some embodiments, the Ziegler-Natta catalyst is made from or contains the reaction product of (a) an organometallic compound of group 1, 2 or 13 of the Periodic Table of elements with (b) a transition metal compound of groups 4 to 10 of the Periodic Table of Elements (new notation). In some embodiments, the transition metal compound is selected from the group consisting of Ti, V, Zr, Cr and Hf. In some embodiments, the transition metal compound is supported on $MgCl_2$.

In some embodiments, catalysts are made from or contain the reaction product of (a) the organometallic compound of group 1, 2 or 13 of the Periodic Table of elements, with (b) a solid catalyst component made from or containing a Ti compound and an electron donor compound supported on $MgCl_2$.

In some embodiments, the organometallic compounds are aluminum alkyl compounds.

In some embodiments, the Ziegler-Natta catalysts are made from or contain the reaction product of:
1) a solid catalyst component made from or containing a Ti compound and an electron donor (internal electron-donor) supported on $MgCl_2$;

2) an aluminum alkyl compound (cocatalyst); and, optionally, 3) an electron-donor compound (external electron-donor).

In some embodiments, the solid catalyst component (1) contains, as an electron-donor, a compound selected from the group consisting of the ethers, ketones, lactones, compounds containing N, P and/or S atoms, and mono- and dicarboxylic acid esters.

In some embodiments, catalysts, having the above-mentioned characteristics, are described in U.S. Pat. No. 4,399,054 and European Patent No. 45977, both incorporated herein by reference.

In some embodiments, the electron-donor compounds are phthalic acid esters or succinic acid esters. In some embodiments, the electron-donor compound is diisobutyl phthalate.

In some embodiments, the electron-donors are the 1,3-diethers. Some useful 1,3-diethers are described in European Patent Application No. EP-A-361 493 and European Patent Application No. EP-728769, both incorporated herein by reference.

In some embodiments, trialkyl aluminum compounds are used as cocatalysts (2). In some embodiments, the trialkyl aluminum compound is selected from the group consisting of Al-triethyl, Al-triisobutyl and Al-tri-n-butyl.

In some embodiments, the electron-donor compounds (3) are used as external electron-donors (added to the Al-alkyl compound). In some embodiments, the external electron-donors are made from or contain aromatic acid esters, heterocyclic compounds, or silicon compounds containing at least one Si—OR bond (where R is a hydrocarbon radical). In some embodiments, the aromatic acid ester is an alkylic benzoate. In some embodiments, the heterocyclic compound is 2,2,6,6-tetramethylpiperidine or 2,6-diisopropylpiperidine.

In some embodiments, the silicon compounds have the formula $R^1_a R^2_b Si(OR^3)_C$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compound is selected from the group consisting of (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), the catalysts are suspended in a hydrocarbon solvent, and the polymerization occurs at temperatures from room temperature to about 60° C. In some embodiments, a quantity of polymer from about 0.5 to about 3 times the weight of the catalyst is produced.

In some embodiments, the operation occurs in liquid monomer. In some embodiments, a quantity of polymer up to 1000 times the weight of the catalyst is produced.

The polymerization process, which can be continuous or batch, is carried out in the presence of the catalysts operating (a) in liquid phase, optionally in the presence of an inert diluent, (b) in gas phase, or (c) by mixed liquid-gas techniques.

In some embodiments, the polymerization temperature is from about 20 to about 100° C. In some embodiments, the pressure is atmospheric or higher.

In some embodiments, the regulation of the molecular weight is carried out by regulators. In some embodiments, the regulator is hydrogen.

In some embodiments, the catalyst system is a metallocene-based catalyst system as disclosed in U.S. Patent Application Publication No. 20060020096 and Patent Cooperation Treaty Publication No. WO98040419.

In some embodiments, the polymerization conditions for preparing the homopolymer or copolymer component B) with metallocene-based catalyst systems are similar to those conditions used with Ziegler-Natta catalysts.

In some embodiments, the polyolefin composition also contain additives, such as antioxidants, light stabilizers, heat stabilizers, colorants and fillers.

In some embodiments, the polyolefin compositions also contain additional polyolefins. In some embodiments, those additional polyolefins are selected from the group consisting of crystalline ethylene homopolymers and copolymers of ethylene with propylene and/or a $C_4$-$C_{10}$ α-olefin, such as HDPE, LLDPE or LDPE.

In some embodiments, the additional polyolefins are elastomeric copolymers, like copolymers of ethylene with propylene and/or higher alpha-olefins. In some embodiments, the alpha-olefins are selected from the group consisting of butene-1, hexene-1, and octene-1. In some embodiments, the copolymers are selected from the group consisting of EPR and EPDM copolymers.

In some embodiments, the additional polyolefins are present in an amount from about 1 to about 10% by weight, alternatively from about 3 to about 7% by weight, based upon the total weight of the polyolefin composition.

In some embodiments, the polyolefin composition is manufactured by mixing the components together, extruding the mixture, and pelletizing the resulting composition.

In a general embodiments, articles of manufacture made of or containing the polyolefin composition are disclosed herein.

In some embodiments, the articles are soft and flexible.

In some embodiments, the polyolefin compositions can be used to prepare articles by extrusion.

In some embodiments, the articles are liners. In some embodiments, the articles are liners for closures, alternatively plastic and/or metal closures.

In some embodiments, the liners for closures are used in twist closures for containers like jars and bottles. In some embodiments, the jars and bottles are made of glass or plastic materials.

In some embodiments, the twist closures are in the form of caps of circular shape, hosting the liner on the inner surface facing the opening in the threaded circular neck of the container. In some embodiments, the caps are made of metal or plastics.

In some embodiments, the liner is used to achieve a tight seal on the rim of the opening.

In some embodiments, the liner can have various kinds of shapes and functions.

In some embodiments, the closures are used in food and pharmaceutical packaging.

In some embodiments, the liners are air and liquid tight.

In some embodiments, the liners can withstand high temperature treatments (sterilization).

In some embodiments, liners are prepared from a process including the following steps:

a) laying down the polyolefin composition in the molten state on the inner surface of the closure; and b) forming the polyolefin composition into the liner.

In some embodiments, the "laying down" step a) is carried out by using extruders and metering devices.

In some embodiments, the extrusion temperatures are from about 160 to about 220° C.

In some embodiments, the process further includes a step of pre-coating the inner surface of the closure with a protective film of a varnish or a lacquer.

In some embodiments, the forming step b) is carried out by compression molding the molten polyolefin composition against the inner surface of the closure.

In some embodiments, the liner preparation process is disclosed in U.S. Pat. No. 5,451,360.

In some embodiments, the liners have different shapes. In some embodiments, the liners have the shape of an "o-ring" or a flat film.

In some embodiments, the polyolefin compositions are prepared without the use of softening agents.

In some embodiments, the liners can withstand high temperature treatments (sterilization) of 110-125° C.

EXAMPLES

The practice and advantages of the various embodiments, compositions and methods as provided herein are disclosed below in the following examples. These Examples are illustrative only, and are not intended to limit the scope of this disclosure in any manner whatsoever.

The following analytical methods are used to characterize the polymer compositions.

Thermal Properties (Melting Temperatures and Enthalpies)

Determined by Differential Scanning calorimetry (DSC) on a Perkin Elmer DSC-7 instrument.

The melting temperatures of the butene-1 copolymer A) were determined according to the following method:

TmII (measured in second heating scan): a weighed sample (5-10 mg) obtained from the polymerization was sealed into aluminum pans and heated at 200° C. with a scanning speed corresponding to 10° C./minute. The sample was kept at 200° C. for 5 minutes to allow a complete melting of the crystallites, thereby cancelling the thermal history of the sample. Successively, after cooling to −20° C. with a scanning speed corresponding to 10° C./minute, the peak temperature was taken as crystallization temperature ($T_c$). After standing 5 minutes at −20° C., the sample was heated for the second time at 200° C. with a scanning speed corresponding to 10° C./min. In this second heating run, the peak temperature, when present is taken as the melting temperature of the polybutene-1 (PB) crystalline form II (TmII) and the area as global melting enthalpy (ΔHfII).

The butene-1 copolymer component A) of the polyolefin composition did not have a TmII peak.

In order to determine the TmI, the sample was melted, kept at 200° C. for 5 minutes and then cooled down to 20° C. with a cooling rate of 10° C./min.

The sample was then stored for 10 days at room temperature. After 10 days, the sample was subjected to DSC, it was cooled to −20° C., and then it was heated at 200° C. with a scanning speed corresponding to 10° C./min. In this heating run, the first peak temperature coming from the lower temperature side in the thermogram was taken as the melting temperature (TmI). The melting temperatures of (i) the propylene homopolymer or copolymer component B) and (ii) the overall composition made from or containing the polymer components A) and B) were measured at the second heating scan under the same conditions as above reported for the determination of TmII of the butene-1 copolymer component A).

Both component B) and the overall composition of the examples show a single melting peak between 130 and 165° C., corresponding to the melting temperature $T_m$.

The area of such melting peak of the overall composition was taken as the melting enthalpy $\Delta H_{fus}$ of the polyolefin composition.

Flexural Elastic Modulus

According to norm ISO 178, measured 10 days after molding.

Shore A and D

According to norm ISO 868, measured 10 days after molding.

Tensile Stress and Elongation at Break

According to norm ISO 527 on compression molded plaques, measured 10 days after molding.

Tension Set

According to norm ISO 2285, measured 10 days after molding.

Compression Set

According to norm ISO 815, measured 10 days after molding;

MIE

Determined according to norm ISO 1133 with a load of 2.16 kg at 190° C.

MFRL

Determined according to norm ISO 1133 with a load of 2.16 kg at 230° C.

Intrinsic Viscosity

Determined according to norm ASTM D 2857 in tetrahydronaphthalene at 135° C.

Density

Determined according to norm ISO 1183 at 23° C.

Comonomer Contents

Determined by IR spectroscopy or by NMR.

For the butene-1 copolymers, the amount of comonomer was calculated from $^{13}$C-NMR spectra of the copolymers. Measurements were performed on a polymer solution (8-12 wt %) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H-$^{13}$C coupling. About 1500 transients were stored in 32K data points using a spectral window of 60 ppm (0-60 ppm).

Copolymer Composition

Diad distribution was calculated from $^{13}$C NMR spectra using the following relations:

$$PB=100\ I_2/\Sigma$$

$$PB=100\ I_2/\Sigma$$

$$BB=100(I_3-I_{19})/\Sigma$$

$$PE=100(I_5+I_6)/\Sigma$$

$$BE=100(I_9+I_{10})/\Sigma$$

$$EE=100(0.5(I_{15}+I_6+I_{10})+0.25(I_{14}))/\Sigma$$

Where $\Sigma=I_2+I_3-I_{19}+I_5+I_6+I_9+I_{10}+0.5(I_{15}+I_6+I_{10})+0.25(I_{14})$ The molar content was obtained from diads using the following relations:

$$P(m\%)=PP+0.5(PE+PB)$$

$$B(m\%)=BB+0.5(BE+PB)$$

$$E(m\%)=EE+0.5(PE+BE)$$

$I_2$, $I_3$, $I_5$, $I_6$, $I_9$, $I_6$, $I_{10}$, $I_{14}$, $I_{15}$, $I_{19}$ are integrals of the peaks in the $^{13}$C NMR spectrum (peak of EEE sequence at 29.9 ppm as reference). The assignments of these peaks were made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983), incorporated by reference herein. The data were collected in Table A (nomenclature according to C. J. Carman, R. A. Harrington and C. E. Wilkes, *Macromolecules*, 10, 536 (1977), incorporated herein by reference).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

For the propylene copolymers, the comonomer content was determined by infrared spectroscopy by collecting the IR spectrum of the sample vs. an air background with a Fourier Transform Infrared spectrometer (FTIR). The instrument data acquisition parameters were:

purge time: 30 seconds minimum;
collect time: 3 minutes minimum;
apodization: Happ-Genzel;
resolution: 2 cm$^{-1}$.

Sample Preparation

Using a hydraulic press, a thick sheet was obtained by pressing about 1 g of sample between two aluminum foils. If homogeneity was uncertain, a minimum of two pressing operations occurred. A small portion was cut from this sheet to mold a film. The film thickness was between 0.02-:0.05 cm (8-20 mils).

Pressing temperature was 180±10° C. (356° F.) and about 10 kg/cm$^2$ (142.2 PSI) pressure for about one minute. Then the pressure was released and the sample was removed from the press and cooled the to room temperature.

The spectrum of a pressed film of the polymer was recorded in absorbance vs. wavenumbers (cm$^{-1}$). The following measurements were used to calculate ethylene and butene-1 content:

Area (At) of the combination absorption bands between 4482 and 3950 cm$^{-1}$, which was used for spectrometric normalization of film thickness.

If ethylene was present, Area (AC2) of the absorption band between 750-700 cm$^{-1}$ after two proper consecutive spectroscopic subtractions of an isotactic non additivated polypropylene spectrum was measured and then, if butene-1 was present, a reference spectrum of a butene-1-propylene random copolymer in the range 800-690 cm$^{-1}$ was used.

If butene-1 was present, Height (DC4) of the absorption band at 769 cm$^{-1}$ (maximum value), after two proper consecutive spectroscopic subtractions of an isotactic non additivated polypropylene spectrum was measured and then, if ethylene was present, a reference spectrum of an ethylene-propylene random copolymer in the range 800-690 cm$^{-1}$ was used.

To calculate the ethylene and butene-1 content, calibration straight lines for ethylene and butene-1 were obtained by using reference samples of ethylene and butene-1.

$M_w/M_n$ determination by GPC

The determination of the means $M_n$ and $M_w$ and $M_w/M_n$ derived therefrom was carried out using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm and their particle size was 13 µm. The mobile phase used was 1-2-4-trichlorobenzene (TCB) and its flow rate was kept at 1.0 ml/min. The measurements were carried out at 150° C. Solution concentrations were 0.1 g/dl in TCB and 0.1 g/l of 2,6-diterbuthyl-p-chresole were added to prevent degradation. For GPC calculation, a universal calibration curve was obtained using 10 polystyrene (PS) standard samples supplied by Polymer Laboratories (peak molecular weights ranging from 580 to 8500000). A third order polynomial fit was used to interpolate the experimental data and obtain the relevant calibration curve. Data acquisition and processing were done using Empower (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and PB respectively, while the Mark-Houwink exponents $\alpha=0.706$ for PS and $\alpha=0.725$ for PB were used.

For butene-1/ethylene copolymers, it was assumed that the composition was constant in the whole range of molecular weight and the K value of the Mark-Houwink relationship was calculated using a linear combination as reported below:

$$K_{EB}=x_E K_{PE}+x_P K_{PB}$$

where $K_{EB}$ was the constant of the copolymer, $K_{PE}$ (4.06×10$^{-4}$, dL/g) and $K_{PB}$ (1.78×10$^{-4}$ dl/g) were the constants of polyethylene and polybutene, $x_E$ and $x_B$ were the ethylene and the butene-1 weight % content. The Mark-Houwink exponents $\alpha=0.725$ was used for the butene-1/ethylene copolymers.

Fractions Soluble and Insoluble in Xylene at 0° C. (XS–0° C.)

2.5 g of the polymer sample were dissolved in 250 ml of xylene at 135° C. under agitation. After 30 minutes, the solution was allowed to cool to 100° C., still under agitation, and then placed in a water and ice bath to cool down to 0° C. Then, the solution was allowed to settle for 1 hour in the water and ice bath. The precipitate was filtered with filter paper. During the filtering, the flask was left in the water and ice bath to keep the flask inner temperature as near to 0° C. as possible. Once the filtering was finished, the filtrate temperature was balanced at 25° C., dipping the volumetric flask in a water-flowing bath for about 30 minutes and then, divided in two 50 ml aliquots. The solution aliquots were evaporated in nitrogen flow, and the residue dried under vacuum at 80° C. until constant weight was reached. If the weight difference between the two residues was not less than 3%, the test was repeated. The percent by weight of polymer soluble (Xylene Solubles at 0° C.=XS 0° C.) was calculated from the average weight of the residues. The insoluble fraction in o-xylene at 0° C. (xylene Insolubles at 0° C.=XI %0° C.) was:

$$XI\%0°\ C.=100-XS\%0°\ C.$$

Fractions Soluble and Insoluble in Xylene at 25° C. (XS–25° C.)

2.5 g of polymer were dissolved in 250 ml of xylene at 135° C. under agitation. After 20 minutes, the solution was allowed to cool to 25° C., still under agitation, and then allowed to settle for 30 minutes. The precipitate was filtered with filter paper, the solution was evaporated in nitrogen flow, and the residue was dried under vacuum at 80° C. until constant weight was reached. The percent by weight of polymer soluble (Xylene Solubles—XS) and insoluble at room temperature (25° C.) was calculated.

As used herein, the percent by weight of polymer insoluble in xylene at room temperature (25° C.) was considered the isotactic index of the polymer. It is believed that this measurement corresponds to the isotactic index determined by extraction with boiling n-heptane, which constitutes the isotactic index of polypropylene polymers as the term is used herein.

Determination of Isotactic Pentads Content 50 mg of each sample were dissolved in 0.5 ml of $C_2D_2Cl_4$.

The $^{13}C$ NMR spectra were acquired on a Bruker DPX-400 (100.61 Mhz, 90° pulse, 12 s delay between pulses). About 3000 transients were stored for each spectrum; the mmmm pentad peak (27.73 ppm) was used as reference.

The microstructure analysis was carried out as described in literature (Macromolecules 1991, 24, 2334-2340, by Asakura T. et Al. and Polymer, 1994, 35, 339, by Chujo R. et Al., incorporated herein by reference).

The percentage value of pentad tacticity (mmmm %) for butene-1 copolymers was the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and signals, falling in the same region, due to the comonomer.

Determination of X-Ray Crystallinity

The X-ray crystallinity was measured with an X-ray Diffraction Powder Diffractometer using the Cu-Kα1 radiation with fixed slits and collecting spectra between diffraction angle 2Θ=5° and 2Θ=35° with step of 0.1° every 6 seconds.

Measurements were performed on compression molded specimens in the form of disks of about 1.5-2.5 mm of thickness and 2.5-4.0 cm of diameter. These specimens were obtained in a compression molding press at a temperature of 200° C.±5° C. without applying pressure for 10 minutes, then applying a pressure of about 10 Kg/cm² for a few seconds and repeating the last operation for 3 times.

The diffraction pattern was used to derive the components for the degree of crystallinity by defining a linear baseline for the whole spectrum and calculating the total area (Ta), expressed in counts/sec·2Θ, between the spectrum profile and the baseline. Then an amorphous profile was defined, along the whole spectrum, that separate, according to the two phase model, the amorphous regions from the crystalline ones. The amorphous area (Aa), expressed in counts/sec·2Θ, was calculated as the area between the amorphous profile and the baseline; and the crystalline area (Ca), expressed in counts/sec·2Θ, was calculated as Ca=Ta−Aa. The degree of crystallinity of the sample was then calculated according to the formula:

$$\%\ Cr=100\times Ca/Ta$$

Examples 1-4 and Comparative Example 1

Materials Used in the Examples

PB-1: butene-1/ethylene copolymer containing 16% by moles of copolymerized ethylene was prepared according to the process disclosed in Patent Cooperation Treaty Publication No. WO2009000637 and in-line blended with a propylene copolymer composition (I) added in amount of 7% by weight with respect to the total weight of the butene-1/ethylene copolymer and the propylene copolymer composition (I).

Such propylene copolymer composition (I) had MFRL of 5.5 g/10 min., total copolymerized ethylene content of 3% by weight, total copolymerized butene-1 content of 6% by weight; XS–25° C. of 19% by weight and $T_m$ of 133° C., and was made of the following two components:

I') 35% by weight of a copolymer of propylene with ethylene (3.2% by weight in the copolymer), and I") 65% by weight of a copolymer of propylene with ethylene (3.2% by weight in the copolymer) and butene-1 (6% by weight in the copolymer);

wherein the amounts of I') and I") were referred to the total weight of I')+I");

PP-1: propylene homopolymer having $T_m$ of 158° C., MFRL of about 7 g/10 min., XS-25° C. of 3% by weight;

PP-2: copolymer of propylene with ethylene, containing 6% by weight of ethylene, having $T_m$ of 133° C., MFRL of about 7 g/10 min., XS–25° C. of 20% by weight;

Stabilizers: blend of 0.05% by weight of pentaerythritol tetrakis(3-(3,5-di-tert-butyl-4-hydroxyphenyl)propionate (Irganox® 1010, sold by BASF) and 0.05% by weight of tris(2,4-di-tert-butylphenyl)phosphite (Irgafos® 168, sold by BASF), the percent amounts being referred to the total weight of the polyolefin composition;

Lubricants: blend of 1% by weight of erucamide (Crodamide® ER, sold by Croda), 1% by weight of Oleamide (Crodamide® OR, sold by Croda) and 1% by weight of Glyceryl Stearate (Atmer® 129, sold by Croda), the percent amounts being referred to the total weight of the polyolefin composition;

Pigment: Titanium dioxide Ti-Pure® R-104, sold by DuPont.

No melting peak was detected in the DSC analysis (second scan) of the above described PB-1.

The materials were melt-blended in a co-rotating twin screw extruder Coperion ZSK40 SC, with screw diameter of 40 mm and screw length/diameter ratio of 43:1, under the following conditions:

extrusion temperature of 180-200° C.;
screw rotation speed of 220 rpm;
production rate of 60 kg/hour.

The properties of the final compositions are reported in Table 1.

The properties of the PB-1 (Comparison Example 1) are also reported in Table 1.

TABLE I

|  |  | Example |  |  |  | Comp. 1 |
|---|---|---|---|---|---|---|
|  |  | 1 | 2 | 3 | 4 |  |
| PB-1 | Weight % | 72.1 | 72.1 | 69.7 | 67.61 | 100 |
| PP-1 | Weight % | 24.0 | — | — | — | — |
| PP-2 | Weight % | — | 24.0 | 26.9 | 29.0 | — |
| Stabilizers | Weight % | 0.1 | 0.1 | 0.1 | 0.1 | — |
| Lubricants | Weight % | 3 | 3 | 3 | 3 | — |
| Pigment | Weight % | 0.8 | 0.8 | 0.3 | 0.3 | — |
| Amount of A)* | Weight % | 69.8 | 69.8 | 67.1 | 65.1 | 93 |
| Amount of B)* | Weight % | 30.2 | 30.2 | 32.9 | 34.9 | 7 |
| Composition Properties |  |  |  |  |  |  |
| $\Delta H_{fus}$ | J/g | 25 | 10.8 | 12.4 | 11.5 | 0 |
| $T_m$ | °C. | 159.1 | 132.3 | 132.8 | 133.6 | — |
| Shore A |  | 87.2 | 78.8 | 81 | 83.5 | 60 |
| Shore D |  | 22.8 | 20 | 19 | 21.8 | <20 |
| Flexural Modulus | MPa |  | 40 | 40 | 40 | <10 |
| MIE | gr/10' | 2.14 | 2.07 | 1.75 | 3.65 | 1.4 |
| Stress at Break | MPa | 16.4 | 14.9 | 16.6 | 15.2 | 11 |
| Elongation at Break | % | 1000 | 1010 | 990 | 1100 | 790 |
| Compression Set 22 hours 23° C. after 10 min. in Autoclave | % | 55 | 47 | 49 | 44 | 32 |
| Compression Set 22 hours 70° C. after10 min. in Autoclave | % | 79 | 84 | 72 | 71 | 100 |
| Compression Set 22 hours 100° C. after 10 min. in Autoclave | % | 88 | 88 |  |  | 100 |

Note:
*weight % with respect to the total weight of A) + B).

What is claimed is:

1. A polyolefin composition comprising:
   A) from about 63 to about 78% by weight, based upon the total weight of the polyolefin composition, of a copolymer of butene-1 with ethylene having a copolymerized ethylene content of up to about 18% by mole, based upon the molar composition of the copolymer, and no melting peak detectable at the DSC at the second heating scan and
   B) from about 22 to about 37% by weight, based upon the total weight of the polyolefin composition, of (i) a propylene homopolymer, or (ii) a propylene copolymer, or (iii) a mixture of two or more of (i) and (ii), having a melting temperature $T_m$, measured by DSC at the second heating scan, of from about 130° C. to about 165° C.,
   wherein (i) the amounts of A) and B)=100 and referred to as the total weight of A)+B) and the DSC second heating scan is carried out with a heating rate of 10° C. per minute and (ii) having a melting enthalpy $\Delta H_{fus}$, measured by DSC at the second heating scan of from about 7 to about 30 J/g.

2. The polyolefin composition of claim 1, wherein the composition has MIE from about 0.5 to about 8 g/10 min. and MIE is the melt flow index at 190° C. with a load of 2.16 kg, determined according to ISO 1133.

3. The polyolefin composition of claim 1, wherein the composition has a flexural modulus equal to or lower than about 150 MPa.

4. The polyolefin composition of claim 1, wherein the butene-1 copolymer component A) has Shore A equal to or lower than about 80.

5. The polyolefin composition of claim 1, comprising:
   i) from about 63 to about 69% by weight of A) and
   ii) from about 31 to about 37% by weight of B).

6. The polyolefin composition of claim 1, wherein the butene-1 copolymer component A) has at least one of the following additional features:
   MIE of from about 0.5 to about 3 g/10 min.;
   a lower limit of the copolymerized ethylene content of about 12% by mole, based upon the molar composition of the copolymer;
   a Shore A value equal to or lower than about 80;
   a Shore D value equal to or lower than about 20;
   a Mw/Mn value, where Mw is the weight average molar mass and Mn is the number average molar mass, both measured by GPC, equal to or lower than about 3;
   a tension set of less than about 30% at 100% of deformation at 23° C. (ISO 2285);
   a percentage of butene-1 units in form of isotactic pentads (mmmm %) greater than about 80%;
   tensile stress at break, measured according to ISO 527, of from about 3 MPa to about 20 MPa;
   tensile elongation at break, measured according to ISO 527, of from about 550% to about 1000%;
   intrinsic viscosity (I.V.) equal to or higher than about 1 dl/g;
   crystallinity of less than about 30% measured via X-ray;
   density of about 0.895 g/cm³ or less;
   content of xylene insoluble fraction at 0° C. of less than about 15% by weight, based upon the total weight of the copolymer.

7. The polyolefin composition of claim 1, wherein the propylene homopolymer or copolymer component B) has MFRL values of from about 0.5 to about 9 g/10 min, where MFRL is the melt flow rate at 230° C. with a load of 2.16 kg, determined according to ISO 1133.

8. An article of manufacture comprising:
   (1) a polyolefin composition comprising:
      A) from about 63 to about 78% by weight, based upon the total weight of the polyolefin composition, of a copolymer of butene-1 with ethylene having a copolymerized ethylene content of up to about 18% by mole, based upon the molar composition of the copolymer, and no melting peak detectable at the DSC at the second heating scan and
      B) from about 22 to about 37% by weight, based upon the total weight of the polyolefin composition, of (i) a propylene homopolymer, or (ii) a propylene copolymer, or (iii) a mixture of two or more of (i) and (ii), having a melting temperature $T_m$, measured by DSC at the second heating scan, of from about 130° C. to about 165° C.,
      wherein (i) the amounts of A) and B)=100 and referred to as the total weight of A)+B) and the DSC second heating scan is carried out with a heating rate of 10° C. per minute and (ii) having a melting enthalpy $\Delta H_{fus}$, measured by DSC at the second heating scan of from about 7 to about 30 J/g.

9. The article of manufacture according to claim 8, wherein the article is a liner.

10. The article of manufacture according to claim 8, wherein the article is a twist closure comprising a liner prepared from the polyolefin composition.

11. The article of manufacture according to claim 10, wherein the twist is for a food container.

12. The article of manufacture according to claim 10, wherein the twist is in the form of a cap.

13. A process for preparing a liner comprising the steps:
1) laying down a polyolefin composition in a molten state on the inner surface of a closure, wherein the polyolefin composition comprises
   A) from about 63 to about 78% by weight, based upon the total weight of the polyolefin composition, of a copolymer of butene-1 with ethylene having a copolymerized ethylene content of up to about 18% by mole, based upon the molar composition of the copolymer, and no melting peak detectable at the DSC at the second heating scan and
   B) from about 22 to about 37% by weight, based upon the total weight of the polyolefin composition, of (i) a propylene homopolymer, or (ii) a propylene copolymer, or (iii) a mixture of two or more of (i) and (ii), having a melting temperature $T_m$, measured by DSC at the second heating scan, of from about 130° C. to about 165° C.,
      wherein (i) the amounts of A) and B)=100 and referred to as the total weight of A)+B) and the DSC second heating scan is carried out with a heating rate of 10° C. per minute and (ii) having a melting enthalpy $\Delta H_{fus}$, measured by DSC at the second heating scan of from about 7 to about 30 J/g; and
2) forming the polyolefin composition into the liner.

* * * * *